July 2, 1968

W. F. PULDA 3,390,907

BUNDLE TYING EQUIPMENT

Filed Oct. 13, 1966

INVENTOR.
WILLIAM F. PULDA

BY

ATTORNEY

July 2, 1968 W. F. PULDA 3,390,907
BUNDLE TYING EQUIPMENT

Filed Oct. 13, 1966 8 Sheets-Sheet 7

INVENTOR.
WILLIAM F. PULDA
BY
ATTORNEY

July 2, 1968 W. F. PULDA 3,390,907
BUNDLE TYING EQUIPMENT
Filed Oct. 13, 1966 8 Sheets-Sheet 8

INVENTOR.
WILLIAM F. PULDA

BY

ATTORNEY

United States Patent Office 3,390,907
Patented July 2, 1968

1

3,390,907
BUNDLE TYING EQUIPMENT
William F. Pulda, Edison, N.J., assignor to Universal
Corrugated Box Machinery Corporation, Cranford,
N.J., a corporation of New Jersey
Filed Oct. 13, 1966, Ser. No. 586,458
18 Claims. (Cl. 289—2)

This invention relates to the art of bundle tying and feeding equipment and more particularly to equipment for feeding and tying a stack of folded box blanks.

As conducive to an understanding of the invention, it is noted that where a stack or bundle of folded boxes for example is tied by an equipment of the type shown in U.S. Patent No. 2,374,900, due to the fact that in forming the knot a loop of string is left in the path of the tying head after the knot has been completed and the tying head moves back to its initial position, engagement of the loop by the tying head often occurs with resultant jamming of the equipment, the clearing of which causes slow up of production.

As the string wrapped around the bundle being tied is not extremely taut during the tying operation, after the bundle is tied the plurality of folded boxes therein are held rather loosely and tend to shift thus requiring an operator to reassemble the bundle.

Where the bundles to be tied must be manually fed to the tying machine, and preferably located thereon in a uniform stack the operation is relatively time-consuming.

Where the bundles are advanced by a conveyor to the bundle tyer, since it is an essential part of the tying operation that a span of thread extend around the leading edge, top and bottom of the stack before the tying operation can be completed, if the bundles are not positively advanced against the span of thread which initially extends substantially vertically in the path of movement of the stack, the proper encirclement of the stack to permit automatic tying thereof may not be achieved.

It is accordingly, among the objects of the invention, to provide a bundle tyer of substantially conventional type which will dependably tie a knot in a string wrapped around a stack or bundle, without likelihood of jamming of the equipment by undesired engagement of the tying head with the knot after it has been completed.

Another object is to provide a bundle tyer of the above type which will ensure that the string wrapped around the bundle will be taut after the tying operation is completed.

Still another object is to provide a feeding equipment for a bundle tyer of the above type which positively advances stacks or bundles in sequence against the span of string caused by the bundle tyer with assurance that the string will be properly positioned for dependable tying action.

According to the invention, these objects are accomplished by the arrangement and combination of elements hereafter described and particularly recited in the claims.

In the accompanying drawings in which are shown one of various possible embodiments of the several features of the invention.

2

Figure 1:
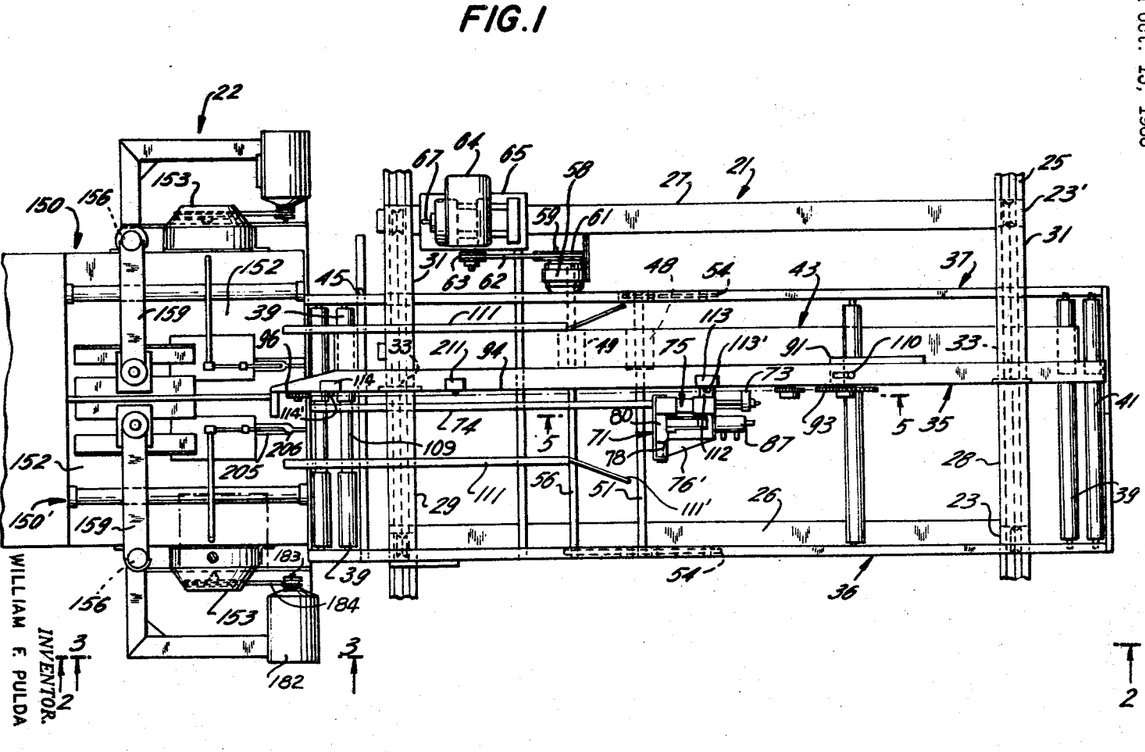
FIG. 1 is a top plan view of the bundle feeding and tying equipment.

Referring now to the drawings, as shown in FIG. 1 the bundle tyer comprises a feeding section 21 and a tying section 22.

Figure 2:
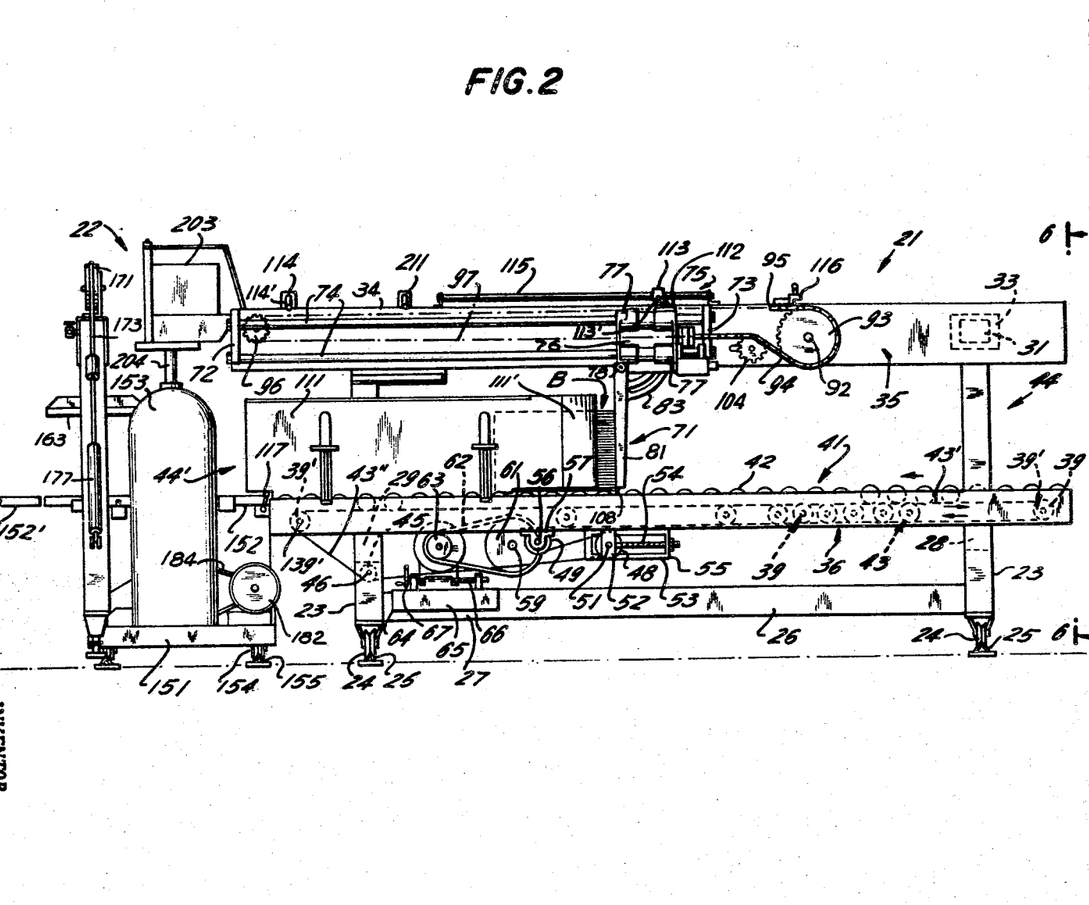
FIG. 2 is a side elevational view taken along line 2—2 of FIG. 1.
Figure 6:
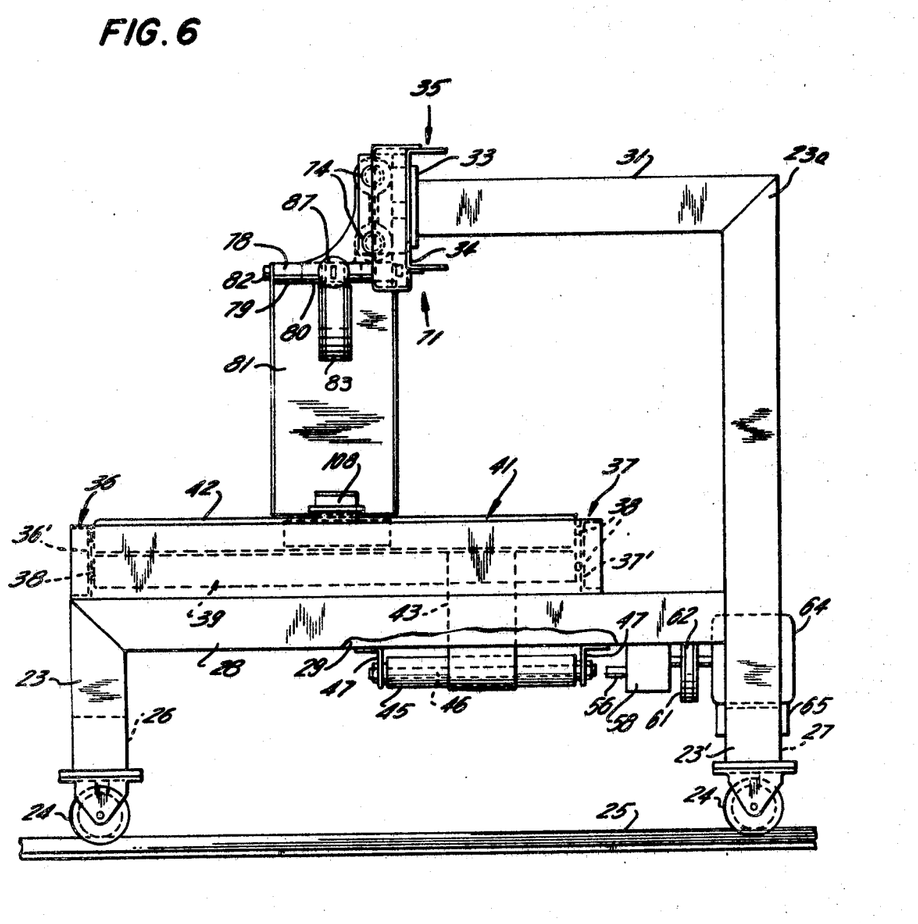
FIG. 6 is an end elevational view taken along line 6—6 of FIG. 2.

As shown in FIGS. 2 and 6, the feeding section 21 comprises a substantially rectangular frame having four standards or legs 23, 23' each carrying a roller 24 at its lower end riding on tracks 25 to permit transverse movement of the frame.

Extending longitudinally of the frame and secured to the pairs of legs 23, 23 and 23', 23' adjacent the lower ends thereof are side beams 26, 27. Extending transversely of the frame and secured to the pairs of legs 23, 23' and 23, 23', at the upper ends of legs 23 and at a point on legs 23' above the beam 27 are end beams 28, 29.

The legs 23' are of length greater than legs 23 as shown in FIG. 6, and the upper end 23a of each leg 23' supports the end of a horizontal beam 31 which extends transversely approximately one-half the width of the frame.

Secured to the free end of each of the horizontal beams 31 is a mounting plate 33 to which is secured the cross piece 34 of a U-shaped channel beam 35 as shown in FIGS. 1, 2 and 6.

Secured to the upper ends of legs 23 and to the end beams 28, 29, inwardly of the legs 23', as shown in FIGS. 1 and 6 and extending longitudinally thereof beyond said legs are parallel U-shaped channel members 36, 37.

Extending transversely between the cross pieces 36', 37' of the channel members 36, 37, and rotatably mounted in suitable bearings 38 secured to the inner surfaces of said cross pieces, are a plurality of spaced rollers 39, 41.

The rollers 39 are in a lower plane than the rollers 41 which define a conveyor, and the rollers 41 preferably are staggered with respect to rollers 39 as shown in FIG. 2, the upper peripheries 42 of the rollers 41 rising above the plane of the channel members 36, 37.

Positioned between the rows of rollers 39, 41 as shown in FIG. 2 is a narrow endless drive belt 43 which rides around the endmost rollers 39' and over the intermediate rollers 39 as shown in FIG. 2. The upper run 43' of belt 43 also engages the lower peripheries of the upper row of roller 41 as shown in FIG. 2 so that upon movement of belt 43, the rollers 41 will rotate in a counterclockwise direction from the inlet end 44 of the feeding section to the outlet end 44' thereof.

The lower run 43" of belt 43 leaving the left hand roller 39' (FIG. 2) rides around idler pulley 45 (FIGS. 2 and 6) mounted on a transverse shaft 46 extending between the legs of a pair of spaced brackets 47 secured to and depending from the end beam 29 on the left side of the frame, then rides around take-up pulley 48 (FIG. 2) to reverse its direction, and then rides around pulley 49 to again reverse its direction.

As shown in FIGS. 1 and 2 the pulley 48 is secured to a transverse shaft 51, the ends of which are rotatably mounted in bearings 52 each slidably mounted in a track frame 53 secured to and depending from the channel members 36, 37. A screw 54 is threaded through the end 55 of each track frame 53 and is rotatably connected at its inner end to each bearing 52. Thus upon rotation of screws 54, the longitudinal position of each bearing 52 and hence the tension on the belt 43 can be adjusted.

The pulley 49 which is the drive pulley for belt 43 is secured to a transverse shaft 56 supported at each end in bearing blocks 57 secured to and depending from channels 36, 37. As is shown in FIGS. 1 and 2 one end of shaft 56 extends into a speed reducer housing 58, the input shaft 59 of which carries a pulley 61. The pulley 61 is connected by belt 62 to a pulley 63 driven by a motor 64.

As shown in FIGS. 1, 2 and 6, the motor 64 is slidably mounted on a base 65 secured to beam 27. Pulley 63 being a variable pitch diameter spring loaded type will change the speed of the belt 62 and the input r.p.m. to gear box 58 through pulley 61, thus changing the speed of the belt 43 through pulley 49 mounted on shaft 56. Because the belt 43 is in contact with the underside of the conveyor rollers 42, hence a speed change takes place on rollers 42 when the motor base 65 is adjusted by the rotation of a threaded screw 66 by crank 67.

Slidably mounted on the channel beam 35 (FIGS. 1, 2, 5, 6) is a pusher plate assembly 71.

Figures 3, 4:
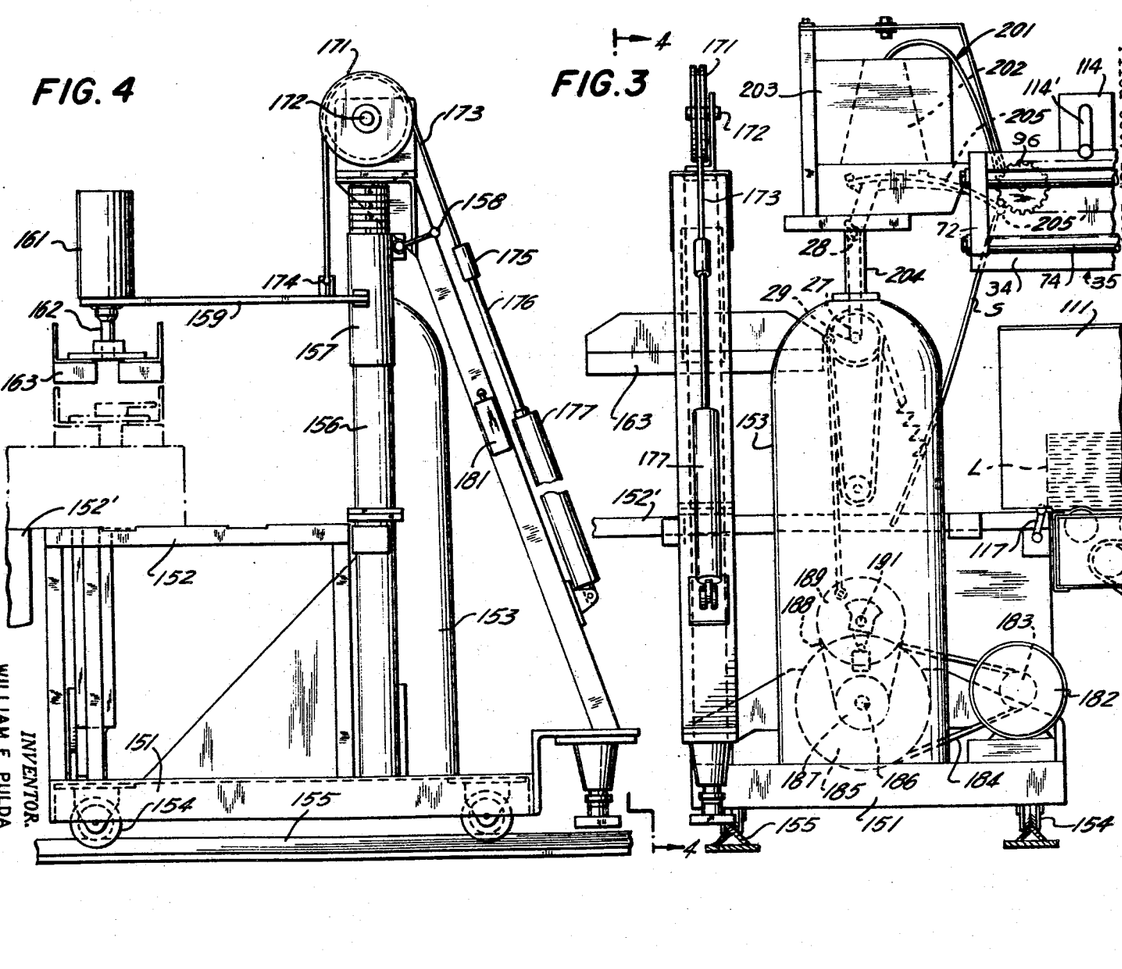
FIG. 3 is a side elevational view of the bundle tyer taken along line 3—3 of FIG. 1.
FIG. 4 is an end elevational view taken along line 4—4 of FIG. 3.

Referring to FIGS. 2 and 3, a pair of spaced parallel blocks 72, 73 are secured to the cross piece 34 of beam 35 and extend outwardly therefrom. Extending between said blocks 72, 73 and secured thereto are spaced, vertically aligned rods 74 on which a pusher plate carriage 75 is slidably mounted.

Figure 5:
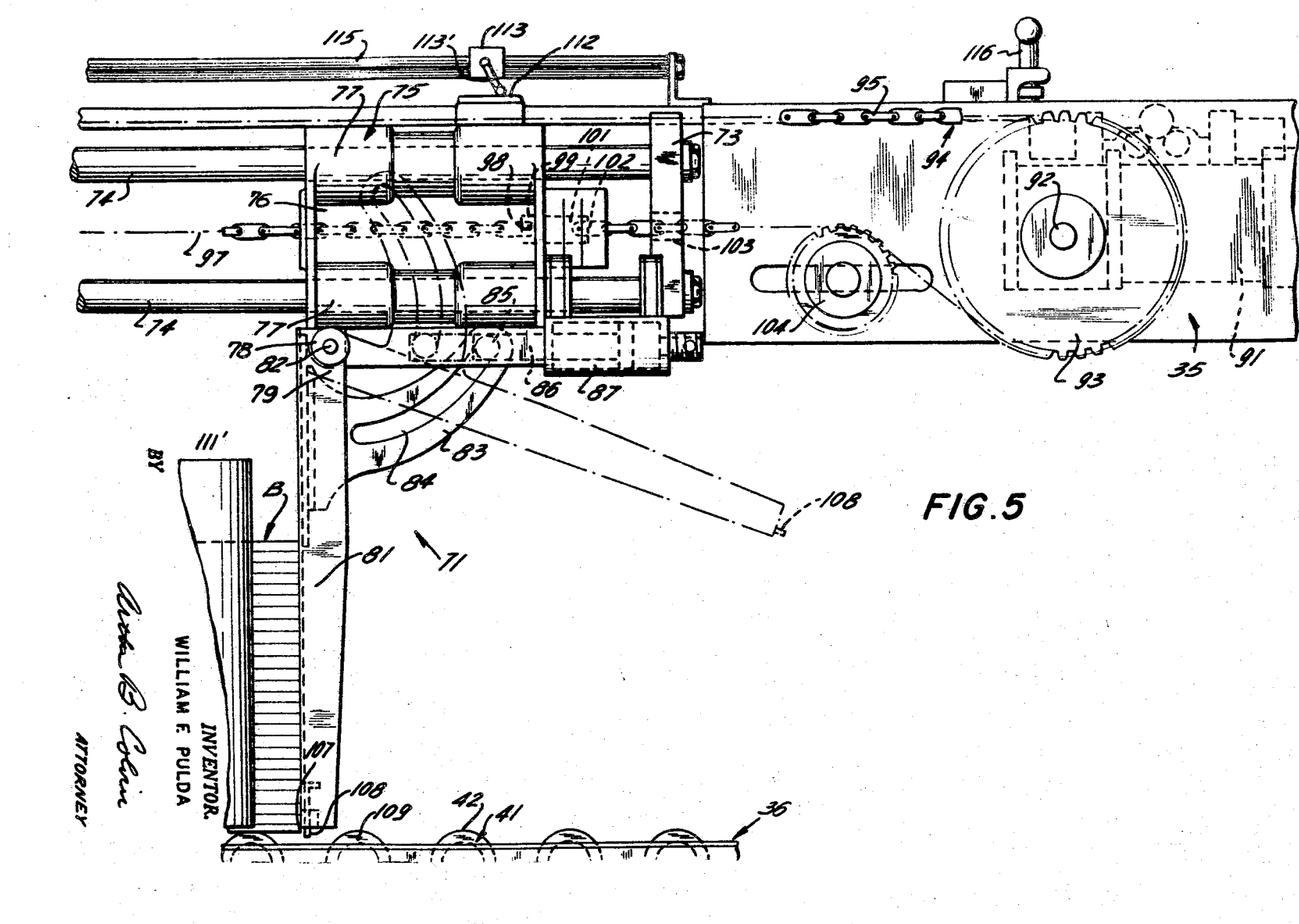
FIG. 5 is a fragmentary detail view on an enlarged scale taken along line 5—5 of FIG. 1.

As is shown in FIGS. 1, 2 and 5, the carriage comprises a vertical plate 76 having vertically aligned hubs 77 through which the rods 74 extend respectively.

The plate 76 has a horizontal plate 76' (FIG. 1) extending laterally outward from its lower edge, said plate 76' having hinge hubs 78 (FIG. 6) formed at its front edge to which the upper edge 79 of a pusher plate 81 is connected by means of a pin 82 extending through the hinge hubs 78 and complementary hinge hubs 80 at the upper edge of the pusher plate.

As shown in FIG. 5, pusher plate 81 has a curved cam arm 83 secured thereto and extending outwardly at right angles to the plane of the pusher plate 81. The cam arm 83 has a curved slot 84 therein through which extends a pin 85 carried by the end of the piston rod 86 of an air cylinder 87 supported by the horizontal plate 76'. The plate 76' has a slot through which the cam arm 83 can move. Thus, as shown in FIG. 5, when the piston rod 86 of the actuator 87 is retracted, the pusher plate 81 will be in the vertical position shown in full lines and when the piston rod 86 is extended the pusher plate 81 will be in the raised position as shown in broken lines in FIG. 5.

Means are provided to locate the carriage 75 at any desired position along the rods 74. To this end as shown in FIGS. 1 and 5, a reversible motor 91, illustratively an air motor is mounted on the channel beam 35. The shaft 92 of the motor 91 carries a sprocket wheel 93 around which extends a sprocket chain 94. The upper run 95 of sprocket chain 94 extends from the sprocket wheel 93 longitudinally to the left as shown in FIGS. 1, 2 and 5 between the channel 35 and the vertical plate 76 and then rides around an idler sprocket wheel 96 mounted on the channel 35. Thereupon, the lower run 97 of the sprocket chain is secured at one end as at 98 (FIG. 5) to a block 99 carried on the rear surface of plate 76. A second block 101 also secured to the rear surface of plate 76 has connected thereto as at 102 the other end of chain 94, said chain then extending through an opening 103 in block 73 and riding around an idler sprocket wheel 104 mounted on the beam 35 and then riding around sprocket wheel 93.

With the construction above-described, it is apparent that depending upon the direction of rotation of sprocket wheel 93, the carriage may be moved to any desired position between the blocks 72, 73 thereby positioning the pusher plate 81 as desired.

In order that the pusher plate may press against the trailing edge 107 of even the lowermost box blank B (FIG. 5) of the stack or bundle of folded boxes to be subsequently tied in the manner hereinafter to be described, the lower edge of the pusher plate carries a finger 108 which is designed to move into the reduced diameter portions 109 of the conveyor rollers which are formed in the rollers located between blocks 72, 73.

To guide the stack B of folded boxes, a pair of spaced, parallel upright deflector members 111 each having a flared inlet end 111' are provided adjacent the outlet end 44' of the feeding section 21.

Means are provided to set the pusher plate assembly 71 to a desired position so that in operation of the device the pusher carriage will have a minimum stroke depending upon the width of the stack of boxes to be advanced to the tying section 22.

To this end, as shown in FIGS. 1, 2 and 5, the carriage 75 carries a control arm 112 which, when the carriage is in its retracted position shown in FIG. 5, will engage the actuating arm 113' of a limit switch 113, and when the carriage has reached its extended position to the left will engage the actuating arm 114' of a limit switch 114.

The switch 113 is slidably mounted on guide rails 115 (FIGS. 2 and 5) carried by channel 35 and may be locked in any desired position along such guide rails.

Thus assuming that the stack B of folded boxes is of width such that it is desired to have the pusher plate 81 act against the stack when it is in the position shown in FIG. 2, the limit switch 113 is moved along the rails 115 to the desired position and locked in place.

Thereupon by means of a two-way valve 116 the motor 91 is actuated in direction to move the carriage 75 by means of sprocket chain 94 until the control arm 112 carried by the carriage is beneath the arm 113' to actuate the switch 113.

The feeding section 21 is particularly designed to feed a stack of box blanks to the bundle tying section 22.

In the illustrative embodiment herein shown, the bundle tying section has two identical tying machines 150, 150' in order to provide two spaced tied cords around the stack B. As the tying machines are identical, only one will be described.

The bundle tying machines employed are illustrative of the type shown and described in Patent No. 2,374,900 and hence will only be described to the extent necessary for a clear understanding of the invention.

Referring to FIGS. 3 and 4 of the drawings, each of the bundle tying machines comprise a base 151 which supports a horizontal table 152 on which the bundles are placed during tying and an upright housing 153 is located on the side of the table 152 in which the drive mechanism for the machine is positioned. Each of the tables 152 may have a horizontal extension 152' to accommodate stacks B larger than the table.

The base is mounted on suitable rollers 154 which ride on tracks 155 to permit alignment of the table 152 with the outlet end 44' of the feeding section 21.

As is shown in FIG. 2, the top surface of table 152 is in a plane just slightly lower than the plane of the rollers 41 so that the stack of blanks B may readily be discharged onto the table.

As is shown in FIG. 1, the two tying machines are positioned so that the table portions 152 thereof are in juxtaposition, with the housings 153 positioned outwardly. Thus the stack of boxes will be advanced by the pusher plate 81 so that substantially one-half of the stack will rest on each of the tables 152.

Rising from the base 151 is a post or column 156 on which a sleeve 157 is slidably mounted, the latter being retained in fixed position by a suitable clamp controlled by locking lever 158. Secured at one end to sleeve 157 and extending laterally outward therefrom is a support arm 159, the free end of which carries a vertically directed actuator 161.

The piston rod 162 of actuator 161 carries a clamp or pressure plate 163 at its lower end which is designed to press against the stack, to ensure a tight bundle in the manner hereinafter to be described.

Means are provided to set the position of the support arm 159 based on the height of the stack of boxes B to be tied. To this end, as shown in FIGS. 2, 3 and 4, a pulley 171 is rotatably mounted on a horizontal axis 172 at the upper end of post 156. Riding around the pulley 171 is a cable 173, one end of which is connected as at 174 to the arm 159, and the other end of which is connected as at 175 to the piston rod 176 of an air actuator 177.

Thus to raise the arm 159 it is merely necessary to move the piston rod 176 inwardly, and to lower the arm 159, it is merely necessary to bleed the actuator 177, the weight of the arm 159 and the mechanism carried thereby, permitting downward movement of said arm. When the arm is in desired position it may be locked by the lever 158, a valve 181 being provided to control the air cylinder 177.

Figure 7:
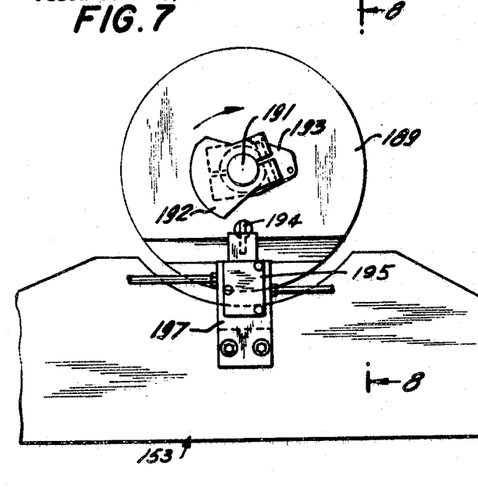
FIG. 7 is a side elevational view showing the cam actuators for the tying machine.
Figure 8:
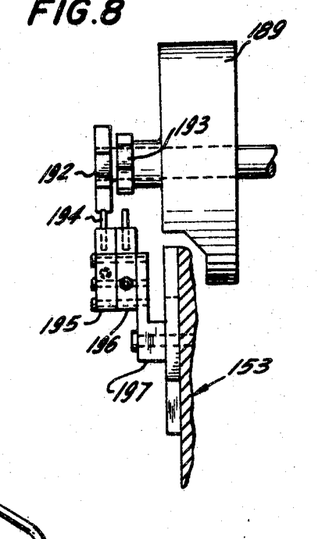
FIG. 8 is a view taken along line 8—8 of FIG. 7.

Positioned on the base 151 is a drive motor 182 for the tying mechanism. The motor 182 drives a pulley 183 which is connected by belt 184 to a pulley 185 positioned in the housing 153. The pulley 185 is mounted on a shaft 186 which carries a pulley 187 that is connected by belt 188 to a pulley 189 mounted on a shaft 191 in said housing. Mounted on shaft 191 (FIGS. 4, 7 and 8) are cams 192, 193 which coact respectively as shown in FIG. 8 with the control members 194 of air jet control valve 195 and pressure plate release valve 196 suitably mounted in rigid position on a bracket 197 affixed to the wall of housing 153.

Figure 9:
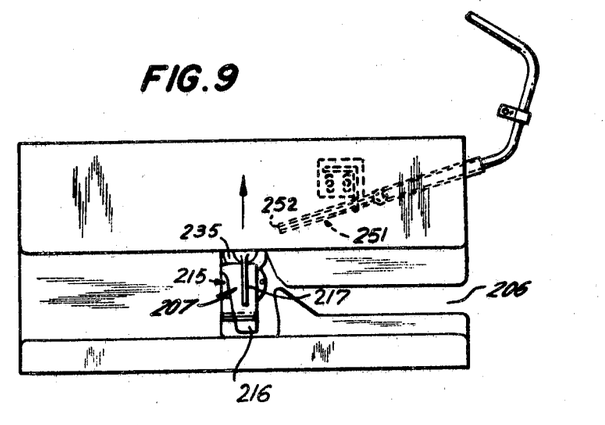
FIG. 9 is a top plan view of the deflector means for the knot.

The bundles are tied by means of a string 201 (FIG. 4) supplied from a ball or other suitable source 202 in a hopper 203, supported by means of a post 204 rising from the casing 153. The string extends through the eye 205' of a needle 205 to be fed around a stack or bundle B through an opening 206 (FIG. 9) in the table 152 to the clutching and tying mechanism of the machine.

As the mechanism for moving the needle 205 in an arcuate path through the opening 206 and for affecting the tying action is identical to that shown in said Patent No. 2,374,900, it will only be described to the extent necessary for a clear understanding of the invention.

Beneath the table 152 is located the string tying mechanism 207 which has associated therewith string clutching or locking mechanism 208, the purpose of which is to clamp and hold the two ends 231, 231 of the string 201 after it has been looped around a bundle and during part of the string tying operation.

In the operation of the feeding section, stacks or bundles of folded boxes B are moved at spaced intervals into the inlet end 44 of the feeding section 21 onto the rollers 41 which are driven by motor 64.

At this time, the piston rod 86 of solenoid 87 is in its extended position so that as shown in FIG. 5 the pusher plate 81 will have been pivoted in a counterclockwise direction toward horizontal position, thereby providing clearance therebeneath for the stack B as it is being advanced by the driven rollers 41.

The advancing stack B will enter the funnel defined by the flared ends 111' of the spaced guide plates 111 and when the leading edges of the stack of blanks engages the microswitch 117 at the outlet end 44' of the feeding section through conventional electrical control circuits (not shown) actuation of microswitch 117 will complete a circuit to air solenoid 87. This will cause the piston rod 86 thereof to be retracted thereby pivoting the pusher plate 81 in a clockwise direction to the position shown in full lines in FIG. 5. At substantially the same time, actuation of microswitch 117 will cause the motor 91 to be energized in direction to rotate the sprocket wheel 93 thereof in a clockwise direction to move the carriage 75 to the left.

As a result, the pusher plate will press against the rear edges 107 of the stack of blanks B to force such stack to the left out of the outlet 44' of the feeding section 21.

Consequently, the leading edge L of the bundle will be forced against the span S (FIG. 3) of string 201 extending from the eye 205' of needle 205 into the opening 206, and with further advance of the bundle B by the pusher plate 81 it is apparent that the string 201 will extend around the leading edge L of the bundle B; over the top thereof and beneath the bottom thereof with the trailing edge 107 of the bundle being positioned adjacent the associated opening 206 so that the latter will be free to receive the free end 205' of the needle 205 when the latter is actuated.

When the control arm 112 carried by carriage 75 abuts against the actuating arm 114' of limit switch 114, it will actuate the latter and through conventional electric circuits the solenoid 87 will be actuated to extend its piston rod 86 thereby pivoting the pusher plate 81 toward horizonal position. In addition, actuation of the limit switch 114 will cause the motor 91 to rotate in the opposite direction thereby moving the carriage 75 to the right until the control arm 112 carried by carriage 75 abuts against the actuating arm 113' of limit switch 113 to stop motor 91 and ready the same to move the carriage 75 to the left for the next cycle.

Furthermore, actuation of limit switch 114 energizes the actuators 161 to cause the piston rods 162 thereof to move downward so that the pressure plates 163 will press tightly against the stack B compressing the latter.

When the carriage initially moved to the left the control arm 112 carried thereby moves past a control switch 211 which had no effect. However, when the carriage was moved to the right, as the control arm 112 moved past the control switch 211, it actuated the latter and through conventional control circuits, energized the motors 182 of the tying machines to start the tying cycle.

The purpose of this operation is to insure that the pusher plate 81 will have been moved clear of the path of movement of the needle 205 before the tying machine is energized to prevent abutment of the needle against the pusher plate if the latter should fail to move.

Figures 10, 11:
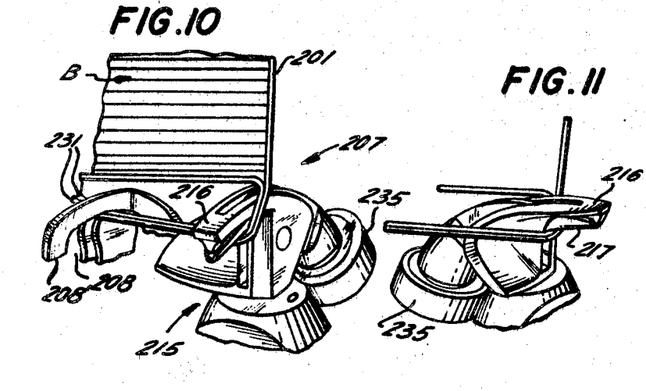
FIGS. 10 to 17 are perspective views showing various stages of the knot tying operation.
Figure 12:
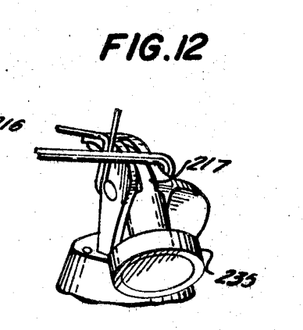
Figure 13:
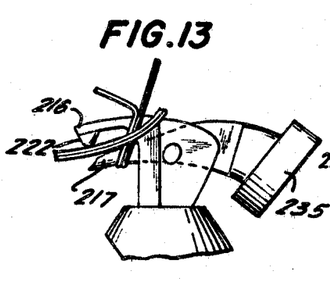

As a result of the energization of the motor 182 the needle arm will be actuated in manner described in said Patent No. 2,374,900 to move the needle 205 through an arcuate path so that its free end moves the string 201 around the knot tying head 215, shown in FIG. 10, for example.

The head 215 includes an upper stationary jaw 216 and a lower movable jaw 217 in cooperation therewith to form a bill. As shown in FIGS. 10 to 15 inclusive, the head 215 will rotate through an angle of 360° while tilting backward and forward and the lower jaw 217 will open and close to form a knot. As such operation is well known in the art and shown and described in said Patent No. 2,374,900, it will not be further described.

Figures 14, 15:
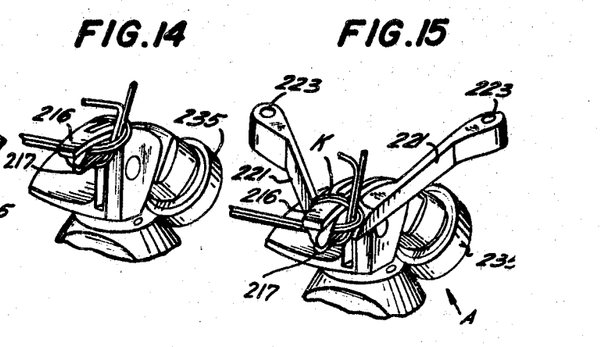
Figure 16:
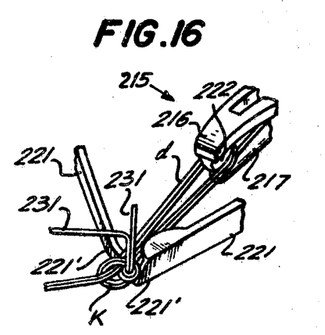
Figure 17:
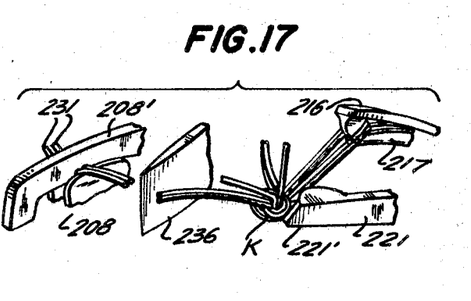

After the knot is formed as shown in FIG. 15, for example, the tying head 215 is rocked rearwardly from the position shown in FIG. 15 to the postions shown in FIGS. 16 and 17. During this rocking action a pair of opposing knot stripping fingers 221 act on the formed knot K (FIG. 15) to peel or force it from the bill of the tying head 215, forming the loop $d$ (shown in FIGS. 16 and 17 and 19 to 21) thereof, which is clamped between the jaws 216, 217 and held against an inclined shoulder 222 formed on the underside of the outer end of jaw 216 (FIG. 13) by the jaw 217 until the rocking action has been nearly completed.

Figures 18, 19, 20:
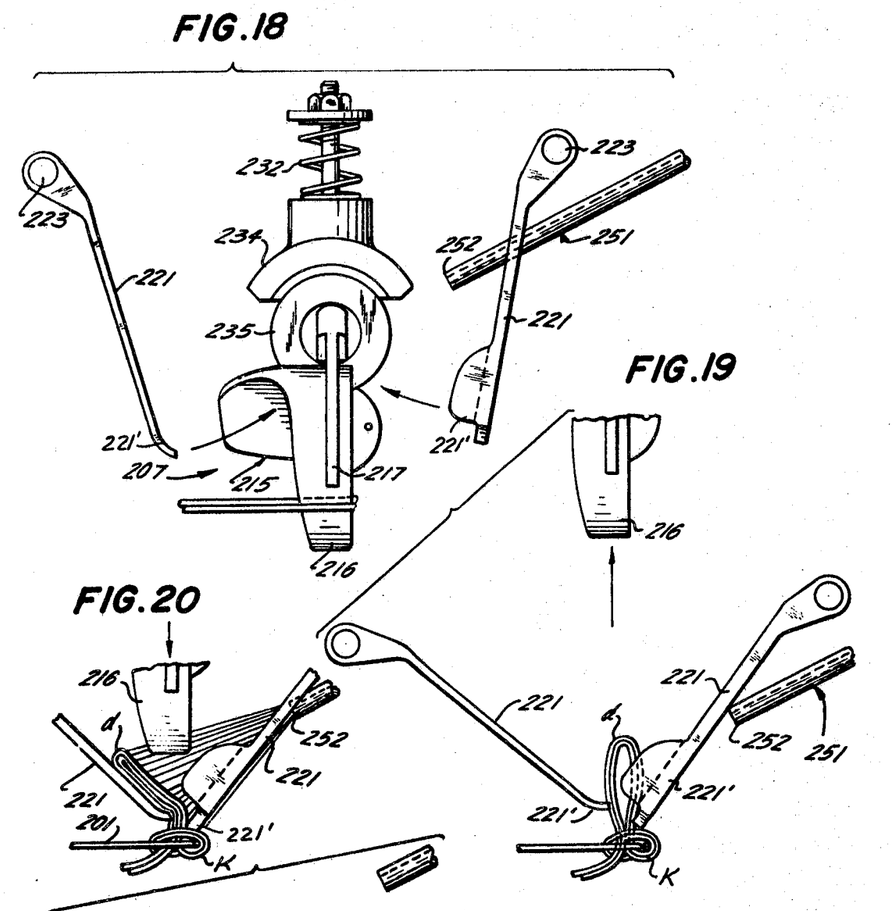
FIG. 18 is a plan view of the tying head, the knot slipping fingers and the deflector nozzle.
FIGS. 19 to 21 are views illustrating the action of the deflector nozzle.

The two fingers 221 are pivoted as at 223 (FIG. 15) to the undersurface of the table 152 with the fingers disposed at each side of the tying head 215 and extending forwardly from their pivots. Each of these fingers 221 is urged inward toward the bill of the tying head by a spring (not shown) and when the tying mechanism is in upright position prior to the forming of the knot, are held spaced from the tying head 215 and in substantially parallel relation to each other as shown in FIG. 18. The mechanism for retaining the fingers 221 in spaced parallel relation is described in detail in said Patent No. 2,374,900. When the tying head is rocked rearwardly, the finger 221 will swing inwardly under the action of their tension springs to the position shown in FIG. 15, into engagement with the respective sides of the tying head 215 at the rear of the formed knot K thereon.

With further rearward movement of the head, the fingers 221 will remain in knot-stripping positions until the head has completed its rearward movement. When the rearward swing of the tying head has been nearly completed as shown in FIG. 16, the forward ends 221' of the fingers will stand at a distance in advance of the bill head 215 in the positions relative thereto substantially as illustrated in FIGS. 16 and 17. As the formed knot is peeled from the head bill 215 by the action of the fingers 221, the looped portion $d$ of the string which is engaged by the inclined shoulder 222 of the jaw 216 (FIG. 16) continues to be held there until the portion of the knot around the bill has been peeled or rolled therefrom along the loop portion $d$. In so doing, the knot is pushed toward the bundle and caused to be tightened on the portions 231 (FIG. 16) of the string extending therefrom.

It is apparent that as the knot is tightened by the action of the fingers 221, the tying head 215 continues to rock rearward thus reducing the angle of the loop holding shoulder 222 of the jaw 216 to the line of pull on the loop $d$. As a result, the jaw will open against the tension of a spring 232 (FIG. 18) which controls jaw 217, when the pulling force of the loop $d$ on the shoulder 222 and the reduction of inclination of the shoulder to the line of pull, are such as to overcome the spring tension of the movable jaw 217. Such tension is provided by the action of the arcuate member 234 (FIG. 18) against the collar 235 which carries such jaw, the spring 232 reacting against member 234.

After the knot has been formed and before the loop $d$ is removed from the tying head 215, the two lengths of string 231 between the tying head 215 and the clutch 208 (FIG. 10) which holds the string in position, swing into engagement with and are severed by a stationary knife 236 (FIG. 17). When the strings have been thus severed, the compression of the spring (not shown) holding the clutch arm 208' is relieved so that the clutch is opened for the next operation. After the knot is formed, the needle is restored to its original position (shown in FIG. 3) providing a span S of string between the needle 205 and the opening 206.

Referring particularly to FIGS. 18 to 21, after the knot K and the loop $d$ have been stripped from the bill and before movement of the stack B by the abutment of the next stack to be tied, rotation of shaft 191 will cause the cam 193 to actuate valve 196. This will deenergize the actuators 161 and cause the piston rods 162 thereof to lift to move the pressure plates 163 away from the tied stack B.

As a result, the slight expansion of the stack will exert tension on the encompassing strings to ensure tightness of the stack.

Figure 21:
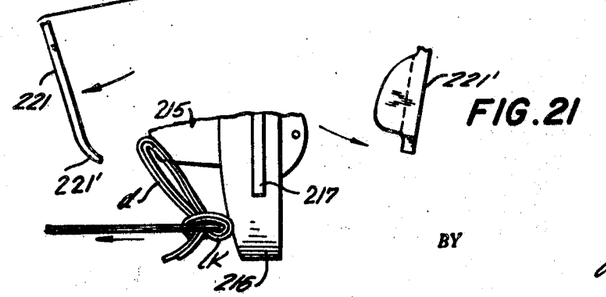

After the loop $d$ has been released from the tying head 215, the tying head 215 will then move back to its original vertical position as shown in FIGS. 20 and 21. It has been found that the bill or front end of the tying head 215 often enters the loop $d$ thereby jamming the machine and preventing tying of the next bundle. To overcome this difficulty, a nozzle 251 is provided which has its outlet end 252 spaced from the region where the loop $d$ will be formed as the head is rocked rearwardly. The cam 192 (FIGS. 7, 8) is so positioned on the shaft 191 that when the tying head 215 is moved rearwardly, after release of the loop $d$ as heretofore described, the valve 195 will be actuated by cam 192 to cause air under pressure to be discharged through nozzle 251. More particularly, as shown in FIGS. 19 and 20, the air under pressure will be discharged through the nozzle 251 before the tying head 215 has moved forwardly sufficiently to reach the loop $d$ so that such loop will be deflected to the left as shown in FIG. 20. Consequently, with further forward movement of the head 215, as shown in FIG. 20, the loop $d$ will be out of the path of movement of the tying head 215 as further shown in FIG. 21. Thereupon the active portion of cam 192 moves away from the valve 191 to cut off the flow of air under pressure through the nozzle.

However, at this time the tying head 215 will have passed beyond the loop $d$ and the knot K so that no inadvertent entry of the tying head bill into the loop $d$ can occur.

It is to be understood that both of the tying machines operate simultaneously so that the string 201 will be wrapped around the stack B and knotted in the manner above described. With the equipment above described, dependable advance of a stack of folded box blanks is provided with assurance that the stack will press with considerable force against the span S of string between the needle and the opening 206 to ensure that the string will be snugly wrapped around the rear, top and bottom of the stack and by reason of the abutment of the untied stack against the previously tied stack, due to the force exerted by the pusher plate, automatic and dependable discharge of the previously tied stack will occur.

Furthermore, inasmuch as the position of the pusher plate may be longitudinally adjusted, its stroke can be the minimum required, based solely on the width of the bundle to be tied. Hence speed of operation is enhanced since the pusher plate is lifted to substantially horizontal position substantially immediately after it has reached its frontmost position, and the next bundle to be tied can pass beneath the lifted pusher plate as the latter moves rearwardly and then is picked up by the vertical pusher plate which is advanced at a greater rate of speed than the advance of the bundle by the rollers 41.

By reason of the air jet which operates in timed relation to the tying operation, there is assurance that the bill or tying head cannot enter a previously tied knot and hence jamming of the machine is prevented.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In a machine for tying a string around a bundle and forming a knot in such string, comprising a rotatable and tiltable tying head having a bill including fixed and movable string clamp jaws, means to tilt said head from knot tying position to knot stripping position, means yieldingly to hold the jaws closed when the head is in knot stripping position, means operable to strip a formed knot from the head bill and while an anchoring portion of the string defining a loop is still engaged by the jaws and to tighten the knot on said portion away from the head lengthwise of its bill, said fixed jaw having a clamping shoulder which is inclined outwardly therefrom in the direction of pull on the clamped loop portion whereby the force necessary to release said looped portion from the head jaws diminishes as the head is rearwardly tilted and becomes effective before the head has reached the limit of its tilt to release said looped portion, and means to deflect said released loop out of the path of said head bill in its tilting movement back to its knot tying position.

2. The combination set forth in claim 1, in which air pressure means are provided reacting against said loop to deflect the latter.

3. The combination set forth in claim 1, in which a main drive shaft is provided, means to rotate said shaft, means operatively connecting said drive shaft to said tying head to actuate the latter, air pressure means adapted to react against said loop to deflect the latter, a cam driven by said shaft, and air pressure control means adapted to be actuated by said cam to energize said air pressure means.

4. The combination set forth in claim 1 in which said deflecting means comprises a nozzle having its outlet directed around said loop, and means after said loop portion has been released to connect a source of air under pressure to said nozzle to deflect the loop out of the path of said head bill in its tilting movement back to its knot tying position.

5. The combination set forth in claim 1 in which said tying machine comprises a table to receive a stack of blanks, a needle positioned about said table, said tying head being positioned beneath said table, said needle slidably supporting a span of string between a source of string and said tying head, means to advance a stack of blanks onto said table against said span of string to wrap the latter around the bottom, leading edge and top of said stack, means to compress said stack of blanks and means to move the needle and the string carried thereby down the trailing edge of said stack for engagement of said string by said tying head for formation of a knot on said string.

6. The combination set forth in claim 5 in which said compression means comprises a vertical actuator having a piston rod and a pressure plate carried by said piston rod and movable against the top of said stack.

7. The combination set forth in claim 5 in which a main drive shaft is provided, means to rotate said shaft, means operatively connecting said drive shaft to said tying head and said needle for actuation thereof, said compression means comprising a vertical actuator having a piston rod and a pressure plate carried by said piston rod and movable against the top of said stack, means to energize said actuator to effect downward movement of said pressure plate, air pressure means adapted to react against said loop to deflect the latter, a pair of cams driven by said shaft, means controlled by one of said cams to energize said actuator to lift the pressure plate away from the stack and air pressure control means controlled by the other cam to energize said air pressure means.

8. The combination set forth in claim 5 in which a post rises from said table, a sleeve is slidably mounted on said table, a support arm secured at one end to said sleeve and extending outwardly therefrom, a vertically positioned actuator carried by the other end of said cam, said actuator having a piston rod, a pressure plate carried by said piston rod and movable against the top of said stack, and means to adjust the position of said sleeve on said post.

9. The construction set forth in claim 5 in which the means to advance said stack comprises a conveyor longitudinally aligned with said table, and in substantially the same horizontal plane, a pusher member positioned over said conveyor, said pusher member being movable from a position substantially at right angles to said conveyor to a position substantially parallel to said conveyor and above the plane of the top of said stack, means mounting said pusher member for longitudinal movement toward and away from said table and means to position the pusher member so that it is at right angles to said conveyor, whereby when said pusher member is moved toward said table it will abut against the trailing end of the stack to advance the latter onto said table, and means when said pusher member has reached the limit of its movement toward the table to position the pusher member so that it is substantially parallel to the conveyor.

10. The combination set forth in claim 5 in which the means to advance said stack comprises a conveyor longitudinally aligned with said table and in substantially the same horizontal plane, a carriage slidably mounted above said conveyor and movable longitudinally thereof toward and away from said table, a pusher plate pivotally mounted on said carriage on an axis at right angles to the direction of movement thereof, means carried by said carriage to pivot said plate between substantially vertical and substantially horizontal positions and means when said carriage is moved toward said table, to pivot said pusher plate to substantially vertical position to abut against the trailing end of the stack to advance the latter onto said table and means when said carriage has reached the limit of its movement toward the table to pivot said pusher plate to substantially horizontal position.

11. The combination set forth in claim 10 in which said conveyor has an outlet end adjacent said table, a control switch is positioned adjacent said outlet adapted to be actuated by the leading edge of said stack advanced by the conveyor, drive means for said carriage, means controlled by the actuation of said switch to energize the pivoting means for said plate to move the latter to vertical position and to actuate said drive means to move the carriage toward said table, a limit switch adjacent said outlet, means carried by said carriage adapted to actuate said limit switch to pivot said pusher plate to substantially horizontal position and energize said drive means in reverse direction.

12. The combination set forth in claim 11 in which a control switch is provided positioned to be actuated upon movement of said carriage away from said table, a main drive shaft is provided, drive means to rotate said shaft, means operatively connecting said shaft to said tying head and said needle for actuation thereof and means controlled by the actuation of said control switch to energize the drive means for said shaft.

13. The combination set forth in claim 10 in which a support frame is provided, positioned over said conveyor and extending longitudinally thereof, a slidable support for said carriage carried by said frame, reversible drive means carried on said frame and operatively connected to said carriage to move the latter toward and away from sid table, a pair of longitudinally spced limit switches mounted on said frame, means adjustably mounting at least one of said switches for movement toward and away from said table, means carried by said carriage, adapted to actuate said switches, and means controlled by the actuation of said switches by said means to energize said drive means to reciprocate said carriage between two extreme positions, one adjacent said table and the other remote from said table, determined by the spacing between said switches.

14. The combination set forth in claim 10 in which an actuator carried by said carriage is operatively connected to said pusher plate to pivot the latter.

15. The combination set forth in claim 13 in which an actuator carried by said carriage is operatively connected to said pusher plate to pivot the latter, the limit switch adjacent said table energizing said actuator to move the pusher plate to substantially horizontal position.

16. A feeding equipment for a rectangular object comprising a conveyor, a support frame positioned above said carriage and extending longitudinally thereof, a carriage slidably mounted on said frame and movable longitudinally of said conveyor, reversible drive means carried by said frame and operatively connected to said carriage to reciprocate the latter between two extreme positions over said conveyor, a pusher plate pivotally mounted on said carriage on an axis at right angles to the direction of movement thereof, means carried by said carriage to pivot said plate between substantially vertical and substantially horizontal position, a pair of spaced limit switches mounted on said frame, means adjustably mounting at least one of said switches for movement longitudinally of said conveyor, means carried by said carriage to actuate said switches, means controlled by the actuation of said switches to energize said drive means to reciprocate said carriage between said two extreme positions determined by the spacing between said switches, and means when said carriage is moved from one extreme position to pivot said pusher plate to substantial vertical position to abut against the trailing end of the object on said carriage to advance the latter and means when the carriage is moved toward the other extreme position to pivot said pusher plate to substantially horizontal position.

17. The combination set forth in claim 16 in which said conveyor comprises a plurality of parallel rollers arranged in a horizontal plane, and endless belt is positioned beneath said rollers with the upper run of said belt in engagement therewith to drive said rollers.

18. The combination set forth in claim 17 in which said rollers have a reduced diameter portion between their ends and said pusher plate has a projection movable into said recess when the pusher plate is pivoted to vertical position.

References Cited
UNITED STATES PATENTS

| | | | |
|---|---|---|---|
| 2,374,900 | 5/1945 | Saxton | 289—2 |
| 2,861,676 | 11/1958 | Rasmussen | 198—218 |
| 2,968,389 | 1/1961 | Erickson et al. | 198—218 |
| 3,070,001 | 12/1962 | Feldkamp | 100—25 |
| 3,101,963 | 8/1963 | Sullivan et al. | 289—2 X |

LOUIS K. RIMRODT, *Primary Examiner.*